Jan. 13, 1953 M. C. ABEL Re. 23,612

TRANSPARENT HOLLOW TOY BALL

Original Filed May 20, 1946

MONA CORDELL ABEL,
INVENTOR.

BY Percy Freeman
Attorney

Reissued Jan. 13, 1953 Re. 23,612

UNITED STATES PATENT OFFICE 23,612

TRANSPARENT HOLLOW TOY BALL

Mona Cordell Abel, Kew Garden Hills, N. Y.

Original No. 2,515,171, dated July 18, 1950, Serial No. 670,989, May 20, 1946. Application for reissue July 16, 1951, Serial No. 237,004

14 Claims. (Cl. 46—41)

Matter enclosed in heavy brackets [ ] appears in the original patent but forms no part of this reissue specification; matter printed in italics indicates the additions made by reissue.

The present invention relates to a hollow transparent or translucent toy containing a body of liquid, such as water, which can gravitate or be forced from one chamber to another while at the same time causing interesting and amusing visual and optical effects.

One of the objects of the invention is to provide a transparent plastic toy of hollow construction divided into chambers and containing a body of liquid which is transferrable from one chamber to another by gravity or by pressure.

Another object of the invention resides in providing a hollow transparent toy divided into chambers by a partition which affords communication between the chambers.

A further object of the invention comprises the provision of a hollow transparent toy which, upon successive inversions, displays interesting, amusing and attractive effects.

Other and still further objects and advantages will be appreciated by those skilled in this art or will be apparent or pointed out hereinafter.

Figure 1:
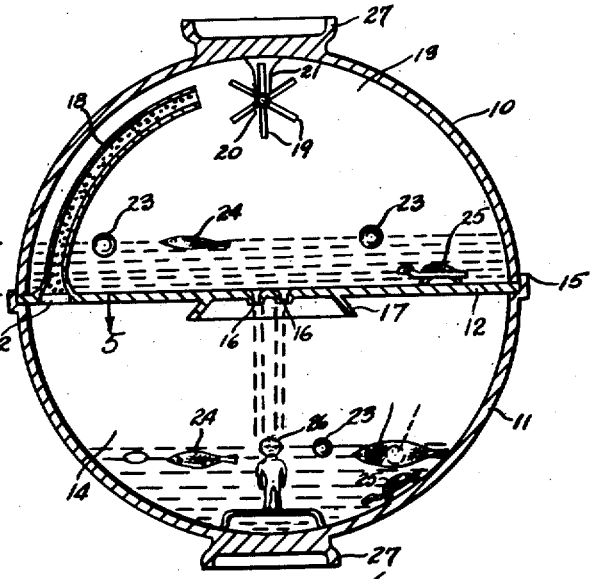
Fig. 1 is a vertical medial section taken through a preferred toy embodying my present invention.
Figure 5:
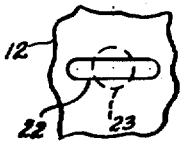
Fig. 5 is a fragmentary view of the partition showing the relationship of the port to a spherical object within the toy.
Figure 6:
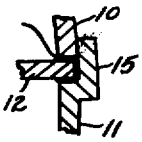
Fig. 6 is a fragmentary sectional view showing a detail of the invention drawn to an enlarged scale to show the sealing means at the joint of the two halves of the toy.

The toy of Figs. 1 and 2 may be spherical or globular and will be hereinafter termed ball-shaped for convenience and brevity, it being understood that such term is used in its broad and generic sense embracing numerous variations in size, outline and appearance. The ball-shaped form of toy represents the preferred embodiment of the invention and is composed of three structural members, namely, the hemispherical members 10 and 11 and the compartmenting member 12 which divides the hollow interior into a plurality of chambers 13 and 14. Members 10 and 11 are preferably of transparent plastic material but may be made of glass, if desired, or other suitable material. For best results, members 10 and 11 should be clear and highly transparent, but may, optionally, be translucent or partially decorated on portions of their surfaces to carry out a desired motif or to suggest or enhance a desired visual or optical effect. Either of the hemispherical members (11 in the particular illustration shown in the drawing) may be shaped to receive the other, such as the offset flange 15 of hemisphere 11 and at such flange members 10, 11 and 12 are cemented together in permanent association.

Compartmenting member 12 is provided with one or more apertures 16 which afford communication between chambers 13 and 14. These apertures may be centrally located, as shown, or may be arranged in a pattern or group in one or more areas of member 12. While a frusto-conical shield 17 is shown as surrounding one side of apertures 16, such may be omitted, if preferred, or varied as to shape and size. An arcuate vent-pipe 18 rises from one side of member 12 (the opposite side from shield 17) adjacent the outer edge of such member and extends well up into chamber 13, terminating close to the paddles 19 of rotatable water-wheel 20 mounted on a standard 21 projecting radially inwardly from the polar portion of hemisphere 10. Member 12 is provided with an aperture 22 which of relatively long and narrow oval shape and the central part of which communicates with the bore of vent-pipe 18.

The toy contains a body of liquid, preferably water, a body of air or other gas, and a suitable assortment of balls 23, imitation fish 24 and imitation turtles 25 and/or other marine animals and objects, some being on each side of member 12. A toy figure, represented at 26, is positioned at the polar portion of hemisphere 11 and extends radially inwardly as illustrated, the said figure being diametrically opposite water-wheel 20 and both being in line with one or more (preferably a group) of apertures 16. Each of the members 10 and 11 has an external base 27 at its polar portion which is capable of serving as a stand.

When the toy is in the position of Fig. 1, the liquid, which was all in chamber 13 from a previous cycle of operation, "rains" or showers down through apertures 16 onto Figure 26. Shield 17 limits the area of the "raining" effect and, more importantly, prevents liquid passing through apertures 16 from following along the under-surface of member 12 as an advancing film. It is preferred to add a surface active agent to the liquid to lower the surface tension thereof and to ensure the "raining" effect, said agent being any of the many compounds well-known for reducing surface tensions, such as the cationic agents of the quaternary ammonium type. Air displaced by the transfer of liquid from chamber 13 to chamber 14 passes through aperture 22 and vent-pipe 18, the movement of air causing some turning of water-wheel 20. The free objects in chamber 13 drop with the lowering liquid level and the objects in chamber 14 rise with the rising liquid level. These objects are preferably, but not necessarily, buoyant so that they float and they are usually appropriately or attractively colored, in this connection it being pointed out that the water or other liquid body may also be colored as by the addition of a dye or coloring material.

Figure 2:
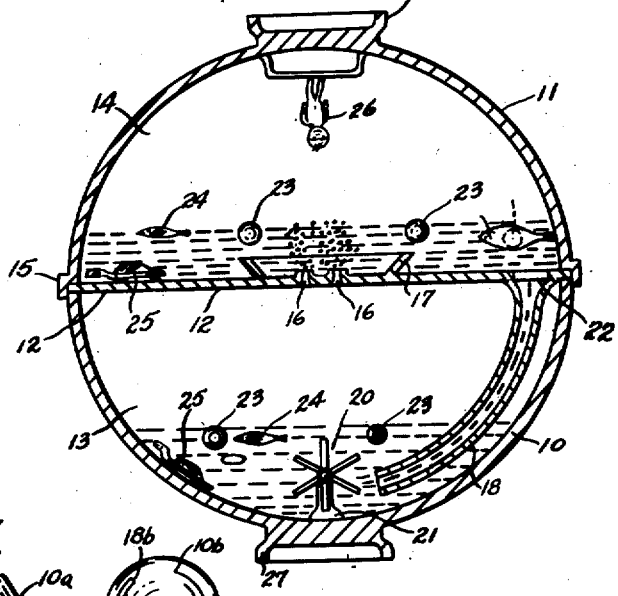
Fig. 2 is a view similar to Fig. 1 but in which the toy has been rotated through an angle of 180°.

When the toy is inverted to the position of Fig. 2, liquid runs down vent-pipe 18 and impinges against the vanes of the water-wheel 20 to turn it. Displaced air finds its way up through the apertures 16. The character of aperture 22 prevents it from being sealed off if one of the balls 23 or objects happens to rest over such aperture as will be appreciated.

Figure 3:
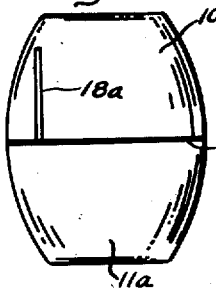
Fig. 3 is an elevational view of a modified form of toy having a barrel shape.
Figure 4:
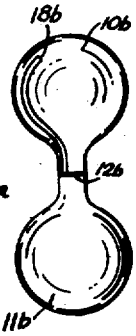
Fig. 4 is an elevational view of a dumb-bell-shaped form of toy.

Instead of making the toy ball-shaped, it may, if desired, be given some other form such as that of a barrel (Fig. 3) or a dumb-bell (Fig. 4). Besides, the toy, if desired, may have more than two compartments or chambers all of which may communicate. These modifications will be understood without any detailed explanation thereof in view of the numerals thereon. Other modifications may be resorted to without departing from the spirit or principle of the invention which is rather defined by the appended claims.

If desired, a highly volatile liquid may be used in place of the water, in which case, application of the warm hand to the surface of the upper compartment 11 in Fig. 2, would speed up the transfer of the liquid from the upper to the lower chamber via tube 18. In such case, however, it would be desirable to evacuate the air from the toy before sealing.

Having thus described my invention, what I claim as new and desire to secure by Letters Patent, is:

1. An invertable toy comprising a pair of transparent hollow sections secured together to form a chamber, an apertured compartmenting member secured within said chamber and dividing the interior into a pair of compartments, a rotatable water-wheel disposed in one of the compartments, a toy figure disposed in the other of said compartments, a quantity of liquid within the toy, said liquid being transferrable selectively from one compartment to the other via said apertures, said toy also containing a plurality of free objects, external base portions on opposite sides of the toy so located that when the toy rests on one base the figure is showered with liquid and a vent pipe providing communication between said compartments, the area of opening in said vent pipe being greater than the area of any of the apertures.

2. A ball-shaped toy comprising a pair of hollow transparent plastic hemispheres secured together to form a spherical chamber, an apertured partition dividing the interior of the chamber into a pair of hemispherical compartments, a rotatable water-wheel disposed at the polar portion of one hemisphere, a toy figure disposed at the polar portion of the other hemisphere, a body of liquid within the toy, said liquid being transferrable selectively from one compartment to the other via said apertures by inverting said toy alternately from one base to the other, said toy also containing a plurality of free objects, and an external base on the polar portion of each such hemisphere, said partition being also provided with a vent-pipe, the bore of which communicates with an elongated aperture in said member.

3. An invertable toy comprising a plurality of transparent plastic hollow sections secured together to form a chamber, an apertured partition member secured within said toy and dividing the interior into a pair of compartments, an object having a movable portion disposed adjacent one end of said chamber, a toy figure disposed at the other end of said chamber, a body of liquid wholly receivable within one of the compartments, an external base on each end of the toy and a pipe providing communication between said compartments, the distal end of said pipe terminating in close proximity to said movable portion of said object.

4. A ball-shaped toy comprising a pair of hollow transparent plastic hemispheres secured together to form a spherical chamber, an apertured partition member secured between said hemispheres and dividing the interior into a pair of hemispherical compartments, a pipe providing communication between said compartments, an object having a movable portion disposed at the polar portion of one hemisphere, one end of said pipe terminating in close proximity to said movable portion, a toy figure disposed at the polar portion of the other hemisphere, a body of liquid wholly receivable within one of the compartments and transferrable selectively from the compartment having said movable portion, to the other via said apertures, and from the other compartment to the first-mentioned compartment via said pipe, the toy also containing a plurality of free objects and an external base on the polar portion of each such hemisphere, said toy figure being in line with apertures in said member.

5. A toy comprising a pair of transparent hollow sections secured together to form a hermetically sealed chamber, an apertured compartmenting member secured within said chamber and dividing the interior thereof into compartments, a fixed object having a movable part and disposed in one compartment remote from said member, a toy figure disposed in the other compartment remote from said member, a body of liquid within the toy transferrable from one compartment to the other and containing a plurality of objects and an external base on each section at opposite ends of the chamber, said body of liquid having a volume not greater than sufficient to fill one of the compartments and containing a surface-active agent which lowers its surface tension appreciably.

6. A ball-shaped toy comprising a pair of hollow transparent plastic hemispheres secured together to form a spherical chamber, an apertured compartmenting [chamber] *member* secured within said hemispheres and dividing the interior into a pair of hemispherical compartments, a pipe providing communication between said compartments, a rotatable water-wheel disposed at the polar region of one hemisphere, a toy figure disposed at the polar region of the other hemisphere, a body of liquid within the chamber transferrable selectively from the water-wheel compartment to the other via said apertures, and from said other compartment to the water-wheel compartment via said pipe, a plurality of free objects within the chamber and an external base on the polar portion of each such hemisphere, said body of liquid containing a surface-active agent which lowers its surface tension appreciably.

7. A toy comprising a hollow transparent plastic body, an apertured partition member dividing the interior of the body into a pair of compartments, a rotatable water-wheel disposed at one end of one compartment, a toy figure disposed at an end of the other compartment, a body of liquid within the toy and containing a plurality of free objects, said liquid being transferrable selectively from one compartment to the other via said apertures, and an external base on the end of each such compartment, said partition member being also provided with a vent-pipe, the bore of which communicates with an elongated aperture in said member, and the distal end of said pipe terminating in close proximity to said water-wheel.

*8. An invertable toy comprising a pair of transparent hollow sections secured together to form a hermetically sealed chamber, an apertured compartmenting member secured within said chamber and dividing the interior into a pair of compartments, an object having a movable portion disposed in one of the compartments, a quantity of liquid within the toy, said liquid being transferrable selectively from one compartment to the other via said apertures, and a vent pipe providing communication between said compartments.*

*9. An invertable toy comprising a plurality of transparent plastic hollow sections secured together to form a chamber, an apertured partition member secured within said toy and dividing the interior into a pair of compartments, an object having a movable portion disposed in one of said compartments, a toy figure disposed in the other compartment, a body of liquid receivable within one of the compartments, an external base on each end of the toy and a pipe providing communication between said compartments.*

*10. A ball-shaped toy comprising a pair of hollow transparent plastic hemispheres secured together to form a spherical chamber, an apertured partition member secured between said hemispheres and dividing the interior into a pair of hemispherical compartments, a pipe providing communication between said compartments, an object having a movable portion disposed in one hemisphere, one end of said pipe terminating in close proximity to said movable portion, a toy figure disposed in the other hemisphere, a body of liquid wholly receivable within one of the compartments and transferrable selectively from the compartment having said movable portion, to the other via said apertures, and from the other compartment to the first-mentioned compartment via said pipe.*

*11. A toy comprising a pair of transparent hollow sections secured together to form a hermetically sealed chamber, an apertured compartmenting member secured within said chamber and dividing the interior thereof into compartments, a fixed object having a movable part and disposed in one compartment, a toy figure disposed in the other compartment, a body of liquid within the toy transferrable from one compartment to the other, and an external base on each section at opposite ends of the chamber, said body of liquid having a volume not greater than sufficient to fill one of the compartments and*

*containing a surface-active agent which lowers its surface tension appreciably.*

*12. A toy comprising a hollow transparent plastic body, an apertured partition member dividing the interior of the body into a pair of compartments, a rotatable water-wheel disposed in one compartment, a toy figure disposed in the other compartment, a body of liquid within the toy and containing a plurality of free objects, said liquid being transferrable selectively from one compartment to the other via said apertures, said partition member being also provided with a vent-pipe, the bore of which communicates with an elongated aperture in said member, and the distal end of said pipe terminating in close proximity to said water-wheel.*

*13. An invertable toy comprising a plurality of transparent plastic hollow sections secured together to form a chamber, an apertured partition member secured within said toy and dividing the interior into a pair of compartments, a pipe providing communication between said compartments, an object having a movable portion disposed in one of said compartments, one end of said pipe terminating in proximity to said movable portion, a body of liquid wholly receivable within one of the compartments and transferrable selectively from the compartment having said movable portion to the other via said apertures, and from the other compartment to the first-mentioned compartment via said pipe.*

*14. A device comprising a hollow spherical housing of transparent material, a diametrical partition in said housing dividing the housing into two substantially equal compartments, said partition having therein one aperture located adjacent the wall of said housing and a second aperture smaller than said first aperture and spaced therefrom, a curved tube secured at one end in said one aperture and extending along the interior surface of the wall of said housing substantially to a location at which a diameter of said housing perpendicular to said partition intersects the wall of said housing in one of said compartments, a liquid level indicator in the other of said compartments, a body of liquid in said housing, and a base on said housing arranged to support said housing on a substantially horizontal surface with said partition substantially horizontal and with said one compartment above and said other compartment below said partition, the quantity of liquid in said housing being such as to require a predetermined time to pass through said second aperture from the upper to the lower compartment and being quickly returnable through said tube from said other to said one compartment when said housing is inverted.*

MONA CORDELL ABEL.

REFERENCES CITED

The following references are of record in the file of this patent or the original patent:

UNITED STATES PATENTS

| Number | Name | Date |
|---|---|---|
| 362,421 | Buddington | May 3, 1887 |
| 2,115,986 | Da Costa | May 3, 1938 |

FOREIGN PATENTS

| Number | Country | Date |
|---|---|---|
| 374,124 | Great Britain | June 6, 1932 |
| 515,089 | Germany | Dec. 24, 1930 |
| 516,946 | Germany | May 26, 1931 |